Aug. 25, 1931.  E. M. ROBERTS, JR., ET AL  1,820,250
ADVERTISING DISPLAY DEVICE
Filed May 15, 1930
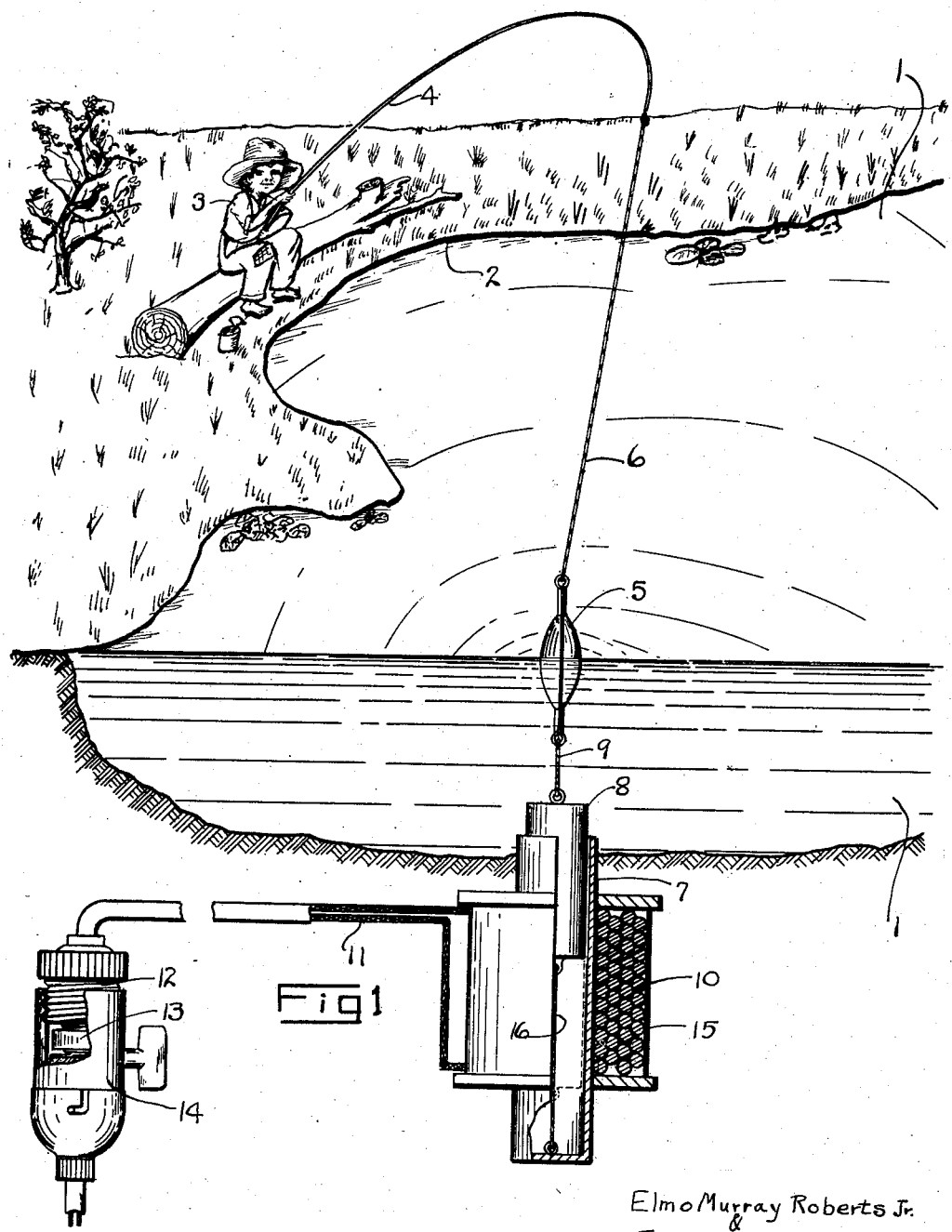
Elmo Murray Roberts Jr.
&
Frank R Penman
INVENTORS
BY Jesse P. Stone
&
Lester B. Clark
ATTORNEYS Patented Aug. 25, 1931

1,820,250

UNITED STATES PATENT OFFICE

ELMO MURRAY ROBERTS, JR., AND FRANK R. PENMAN, OF NACOGDOCHES, TEXAS, ASSIGNORS OF ONE-THIRD TO BEN T. WILSON, OF NACOGDOCHES COUNTY, TEXAS

ADVERTISING DISPLAY DEVICE

Application filed May 15, 1930. Serial No. 452,582.

Our invention relates to an attention attracting or arresting mechanism which may be incorporated with display devices for use for advertising purposes and particularly to advertisements for use in the sale of fishing tackle, sporting goods and the like.

It is an object of the invention to provide a mechanical device which may be used to cause intermittent movement of an object connected therewith.

It is an object of the invention to provide an attractive display for advertising purposes which will be particularly effective in attracting the attention of the public and to form a basis for the display of goods connected particularly with the sport of fishing.

We desire to provide a device which may be operated electrically or magnetically or by any equivalent mechanical means whereby a lifelike simulation of a fisherman may be made and which, because of the movements of the bobber and the fishing tackle, the attention of the public may be attracted.

We also have as an object to provide a simple device which is cheap and easily constructed and installed whereby the sale of fishing tackle will be aided.

In the drawings herewith we have shown one practical application of the device wherein Fig. 1 is a view showing the manner in which our device may be employed, the construction of the apparatus being shown partly in section and partly in elevation.

Fig. 2 shows one wiring diagram for use in combination with the device.

In carrying out the invention for purposes of illustration in this application it is contemplated that a fishing pond or lake shall be constructed in miniature having a fisherman on the bank thereof shown in the act of fishing in the pond. It is to be understood that the invention may be applied for purposes of moving various objects with a view of mystifying the spectator and is not to be limited to the fishing tackle here described. In the drawings, the pond indicated at 1, is shown as being formed with a basin or container very closely simulating the appearance of a fishing pond. On the bank indicated at 2 is shown a model of a boy 3, holding a fishing pole 4. The fishing pole will ordinarily be of some flexible material looking like the ordinary fishing pole but being capable of being bent by movements of the bobber 5, which is secured to the pole by a line 6.

In the bottom of the container forming the basis of the pond or lake is a recess or well 7 closed at the lower end and forming the interior of the solenoid. Within this container 7 is a core 8 preferably of soft iron or laminations thereof, said core being connected by means of a flexible line 9 to the bobber 5. It is to be understood that the bobber will be of the usual type employed in fishing and capable, because of its buoyancy, of floating on top of the water and holding the core 8 elevated in the container 7, while the solenoid may be of any size or shape to obtain the desired effect.

The container is wound about with windings 10 of an electric conductor 11, which is adapted to be connected through an ordinary type of plug 12 and current interruptor 13, with an ordinary light socket 14 or other source of electricity. The windings 10 of the solenoid are preferably encased within a housing 15 so that the same may be protected and watertight.

The core 8 is connected with the lower end of the container by a flexible cord 16 so that the upward movement of the core in the solenoid may be limited and it will not become entirely displaced from the solenoid by the bobbing action of the float 5.

The current interruptor 13 is an ordinary type of commerical button which may be used in sockets of this character and may be purchased on the market. Such flash buttons operate through the principal of expansion of a connecting arm under heat to interrupt the current so as to cause an intermittent flow of current through the circuit. These current interrupters may be purchased of different capacities, some tending to interrupt the current at short intervals and others at longer intervals. We find that the use of both long and short period interrupters in series in the socket or arranged in parallel will give an erratic movement to the bobber and we wish it understood that the combination may be of a current interrupting device to actuate the solenoid in the most lifelike manner. Fig. 2 shows an arrangement with a plurality of flash buttons arranged in series so that an indefinite number of time combinations for the interruptions may be obtained. A two-wire circuit is illustrated but a three-wire circuit may be employed also.

In the operation of this device the bobber may be employed or omitted as desired. If the bobber is omitted the pole 4 will be preferably made of resilient metal or other material and adapted to be bent by the weight of the core 8 of the solenoid. When the current is actuated to pull the solenoid core 8 downwardly into the well 7 a jerk will be delivered upon the line 6, flexing the pole 7 and giving the appearance of a fish tugging upon the line. This jerk will be repeated as often as the current is turned on after being interrupted in the usual manner. It is preferred, however, to use the bobber 5 for this is a more attractive display and attracts the attention of the public more quickly than does the pole without the bobber. When the current comes through the coil of the solenoid after being interrupted the downward jerk of the core will jerk the bobber under and the current will almost immediately be interrupted, allowing the bobber to again come to the surface. Any amount of slack may be provided in the fish line so that a slight movement of the float does not bend the pole but when it is drawn below the surface the pole will be flexed. By proper regulation the appearance of a fish tugging at the line may be very clearly simulated. This appearance of realism may be increased by having gold fish, turtles, crawfish, and the like about the bank of the pond. It is also intended that artificial fish may be attached to the line 9 below the bobber or float and above the core 8. Movement of the line would appear to spectators as being caused by the fish which would also move. Such artificial fish could be mounted for movement in the pond if desired and thus come in contact with the fish line.

It is contemplated that this device will be the center of any representation of any type whatever, such as a country road or landscape, and any desired layout to imitate the appearance of the usual fishing hole may be used. By the use of a current interrupter which will work irregularly so as to best imitate the nibbling of a fish, the display may be made most attractive. While we show an electrically operated device it is to be understood that the invention is not limited thereto. The fishing tackle which is on display for sale may be arranged about this device so that it may be inspected by prospective purchasers.

While the flash buttons described are one means of causing an interrupted flow of current it seems obvious that any mechanical or magnetic mechanism may be used in their stead. Thus a rotating interrupter drum may be used of the type employed in operating flashing electric signs.

What we claim as new is:

1. A display device including a stationary pole, a line thereon, a float on said line adapted to be submerged, and automatically operated means connected thereto to move said float downwardly at intervals of time and then release the same.

2. A display device including a pole, a line thereon, a float on said line, a core of magnetic material connected with said float and adapted to be held suspended thereto, a solenoid winding about said core, means to deliver an electric current to said winding, and means independently of said solenoid to automatically interrupt said current.

3. A display device including a pole, a line thereon, a float on said line, a core of magnetic material connected with said float and adapted to be held suspended thereto, a solenoid winding about said core, means to deliver an electric current to said winding to depress said core, means to automatically interrupt said current to release said core, and means to limit the upward movement of said core and float.

4. A display device including a pole, a line thereon, a float on said line, a core of magnetic material connected with said float and adapted to be held suspended thereto, a solenoid winding about said core, means to deliver an electric current to said winding to energize said winding and thus depress said core, and means to automatically interrupt said current, whereby said float will be intermittently moved as a simulation of a fish biting thereon.

5. As a display device, a container with liquid therein, a pole, a line thereon, a float on said line adapted to lie on said liquid, a solenoid at the bottom of said container, a connection between said float and solenoid and means to energize said solenoid at predetermined intervals to depress said float.

6. A device of the character described including in combination a solenoid, a core therein, means to intermittently energize said solenoid, and an object attached to said core and adapted to be moved by said core when said solenoid is energized, said solenoid and core being so concealed that the cause of movement of said object is not apparent.

7. A device of the character described including a fixed fishing pole, a line and bobber connected thereto, a submerged electromagnet, a core for said magnet connected to said bobber, an electric circuit for said electromagnet, and means including a plurality of flash buttons disposed in said circuit whereby said circuit will be closed at intervals to energize said magnet and depress said core and bobber to simulate a fish biting upon said line.

8. A display device including a pole, a line thereon, a weight on said line adapted to be submerged, a float on said line above said weight, an electrically responsive operated means in contact with said weight to move said float downwardly at intervals of time and then release the same.

In testimony whereof we hereunto affix our signatures this 3rd day of May, A. D. 1930.

ELMO MURRAY ROBERTS, Jr.
FRANK R. PENMAN.